United States Patent
Kikuchi et al.

(10) Patent No.: US 7,050,268 B2
(45) Date of Patent: May 23, 2006

(54) DISK DRIVE WITH READ IC CHIP AND WRITE IC CHIP MOUNTED RESPECTIVELY ON SUSPENSION AND ARM

(75) Inventors: Hideyuki Kikuchi, Kawasaki (JP); Masashige Sato, Kawasaki (JP); Kazuo Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 48 days.

(21) Appl. No.: 10/720,996

(22) Filed: Nov. 24, 2003

(65) Prior Publication Data

US 2004/0130823 A1   Jul. 8, 2004

Related U.S. Application Data

(63) Continuation of application No. PCT/JP01/04388, filed on May 25, 2001.

(51) Int. Cl.
 *G11B 5/48* (2006.01)
 *G11B 21/16* (2006.01)

(52) U.S. Cl. .................... 360/244.1; 360/264.2

(58) Field of Classification Search ............ 360/244.1, 360/264.2
See application file for complete search history.

(56) References Cited

U.S. PATENT DOCUMENTS 6,377,411 B1 * 4/2002 Katsumata et al. ......... 360/323

FOREIGN PATENT DOCUMENTS

| EP | 1014342 A2 * | 6/2000 |
|---|---|---|
| JP | 6-036252 | 2/1994 |
| JP | 11-185233 | 7/1999 |
| JP | 2000-207720 | 7/2000 |
| JP | 2000-339606 | 12/2000 |
| JP | 2001-068760 | 3/2001 |
| JP | 2003077233 A * | 3/2003 |

* cited by examiner

*Primary Examiner*—Craig A. Renner
(74) *Attorney, Agent, or Firm*—Greer, Burns & Crain, Ltd.

(57) ABSTRACT

A dedicated read IC chip is mounted on a head suspension. The dedicated read IC chip is located closer to a read element. A stray capacitance of a wiring can be reduced. Even if the electric resistance value of the read element increases, the magnetic information data of a higher density can be read out. Moreover, the dedicated read IC chip generates little heat. Even if the dedicated read IC chip is located on the head suspension, an excessive heat cannot be transmitted to the head suspension from the dedicated read IC chip. The mechanical properties and shape of the head suspension can be maintained as expected.

4 Claims, 3 Drawing Sheets

DISK DRIVE WITH READ IC CHIP AND WRITE IC CHIP MOUNTED RESPECTIVELY ON SUSPENSION AND ARM

This is continuation of International PCT Application No. PCT/JP01/04388, filed May 25, 2001.

BACKGROUND OF THE INVENTION

1. Field of the Invention

The present invention relates to a head suspension assembly incorporated in a recording disk drive such as a hard disk drive (HDD). In particular, the invention relates to a head suspension assembly comprising a head slider supporting at least a read element, and a head suspension supporting the head slider at the tip end.

2. Description of the Prior Art

The concept of so-called COS (Chip On Suspension) is well known in the technical field of a hard disk drive (HDD). The COS utilizes a so-called head IC (Integrated Circuit) chip fixed on a head suspension. The head IC chip incorporates a read signal processing circuit and a write signal processing circuit.

The head IC chip can be located closer to a read element and/or a write element on the head slider based on the COS. Wirings or lead wires can be shortened between the read element and the head IC chip as well as between the write element and the head IC chip. The stray capacitance of the lead wire can be reduced. The reduction of the stray capacitance serves to realize the operation of reading and writing information data at a higher frequency bandwidth.

However, the head IC chip generates a large amount of heat energy. The heat causes changes in the mechanical properties, such as a spring constant, the shape, and the like, of the head suspension. For example, if the spring constant of the head suspension decreases, the head slider supported on the tip end of the head suspension suffers from reduction in the flying height. The head slider is likely to collide against a magnetic recording disk.

SUMMARY OF THE INVENTION

It is accordingly an object of the present invention to provide a head suspension assembly capable of reducing the stray capacitance without losing expected mechanical properties and without suffering from a change in the shape.

According to a first aspect of the invention, there is provided a head suspension assembly comprising: a head suspension supporting a head slider at the tip end; a read signal amplifier circuit located on the head suspension and connected to a read element on the head slider; and a write signal amplifier circuit located at a position spaced from the head suspension and connected to a write element on the head slider.

The read signal amplifier circuit can be located closer to the read element in the head suspension assembly. A wiring can be shortened between the read element and the read signal amplifier circuit. The stray capacitance of the wiring can thus be reduced. The head suspension assembly of the type enables establishment of a higher density of the magnetic information data even if the assembly employs the read element such a tunnel-junction magnetoresistive element having a high electric resistance value, for example.

In general, the read signal amplifier circuit solely suffers from a smaller amount of heat energy as compared with the write signal amplifier circuit. Even if the read signal amplifier circuit is located on the head suspension, an excessive heat cannot be transmitted to the head suspension from the read signal amplifier circuit. The mechanical properties and the shape of the head suspension can be maintained as expected. In this case, the read signal amplifier circuit may be mounted on the head suspension in the form of an IC chip. Alternatively, the read signal amplifier circuit may be formed directly on the head suspension.

The length of a wiring connecting the read element to the read signal amplifier circuit may be set shorter than the length of a wiring connecting the write element to the write signal amplifier circuit in the head suspension assembly. The read signal amplifier circuit may be located closer to the head slider than the write signal amplifier circuit is.

According to a second aspect of the invention, there is provided a head suspension assembly comprising: a head suspension supporting a head slider at the tip end; and a dedicated read IC chip located on the head suspension and connected to a read element on the head slider.

The read signal amplifier circuit can be located closer to the read element in the head suspension assembly. A wiring can be shortened between the read element and the dedicated read IC chip. The stray capacitance of the wiring can be reduced. The head suspension assembly of the type enables establishment of a higher density of the magnetic information data even if the assembly employs the read element such a tunnel-junction magnetoresistive element having a high electric resistance value, for example.

The dedicated read IC chip solely suffers from a smaller amount of heat energy in the same manner as described above. Even if the dedicated read IC chip is located on the head suspension, an excessive heat cannot be transmitted to the head suspension from the dedicated read IC chip. The mechanical properties and the shape of the head suspension can thus be maintained as expected.

The head suspension assembly may further comprise a dedicated write IC chip located at a position spaced from the head suspension and connected to a write element on the head slider. In this case, the length of a wiring connecting the read element to the dedicated read IC chip is preferably set shorter than the length of a wiring connecting the write element to the dedicated write IC chip. The dedicated read IC chip may be located closer to the head slider than the dedicated write IC chip is.

The head suspension assembly may be attached to the tip end of a swinging arm incorporated in a recording disk drive such as a hard disk drive (HDD). The swinging arm is allowed to swing about a support shaft, for example.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
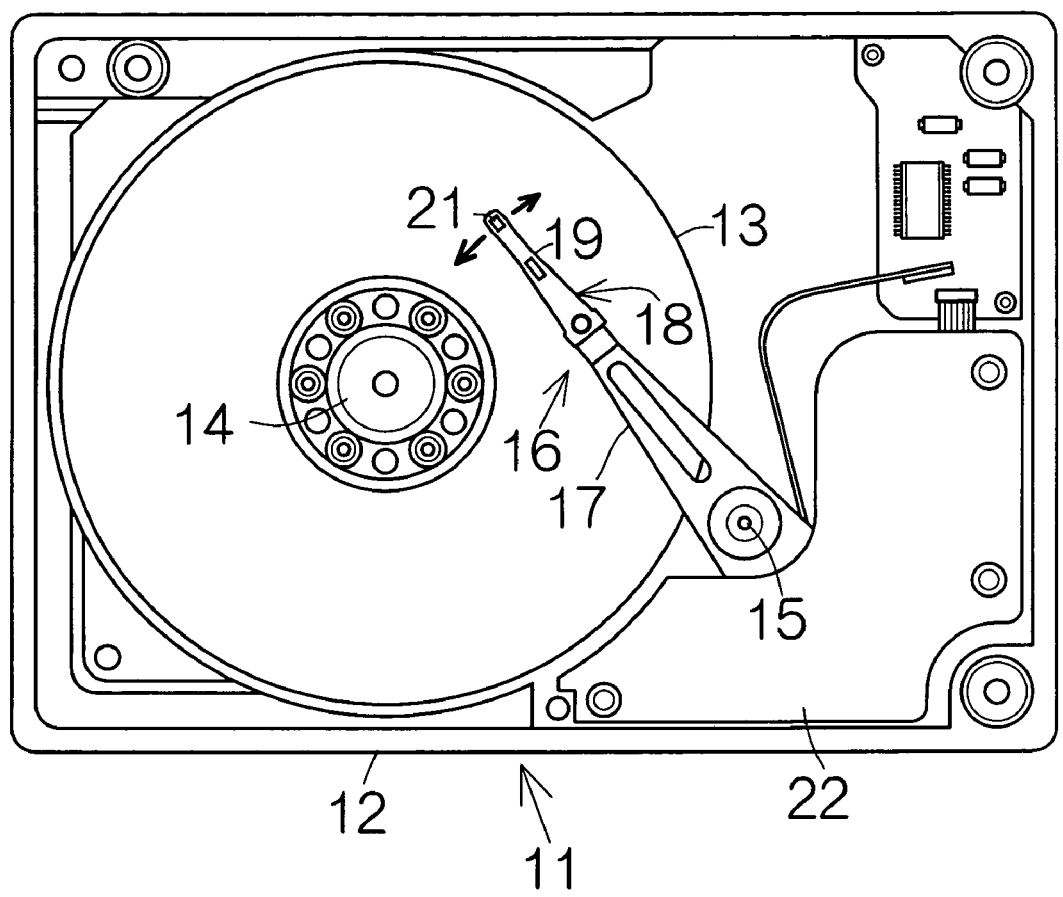
FIG. 1 is a plan view schematically illustrating the inner structure of a hard disk drive (HDD)

FIG. 1 schematically illustrates the inner structure of a hard disk drive (HDD) 11 as an example of a recording disk drive or storage device. The HDD 11 includes a box-shaped main enclosure 12 defining an inner space of a flat parallelepiped, for example. At least one magnetic recording disk 13 as a recording medium is incorporated within the inner space. The magnetic recording disk 13 is mounted on the driving shaft of a spindle motor 14. The spindle motor 14 is allowed to drive the magnetic recording disk 13 for rotation at a higher revolution speed such as 7,200 rpm, 10,000 rpm, or the like, for example. A cover, not shown, is coupled to the main enclosure 12 so as to define the closed inner space between the main enclosure 12 and the cover itself.

A carriage 16 is also accommodated in the inner space of the main enclosure 12. The carriage 16 is designed to swing about a vertical support shaft 15. The carriage 16 comprises a rigid swinging arm 17 extending in the horizontal direction from the vertical support shaft 15, and ahead suspension assembly 18 attached to the tip end of the swinging arm 17. The head suspension assembly 18 includes an elastic suspension 19 extending in the forward direction from the tip end of the swinging arm 17. As conventionally known, a flying head slider 21 is supported at the tip end of the elastic suspension 19. A write element and a read element, both not shown, are mounted on the flying head slider 21. The write head may be a thin film head capable of writing magnetic information data onto the magnetic recording disk 13. The read element may be a tunnel-junction magnetoresistive (TMR) element capable of reading magnetic information data from the magnetic recording disk 13.

The elastic suspension 19 serves to urge the flying head slider 21 toward the surface of the magnetic recording disk 13. When the magnetic recording disk 13 rotates, the flying head slider 21 is allowed to receive airflow generated along the rotating magnetic recording disk 13. The airflow serves to generate a positive pressure or lift on the flying head slider 21. The flying head slider 21 is thus allowed to keep flying above the surface of the magnetic recording disk 13 during the rotation of the magnetic recording disk 13 at a higher stability established by the balance between the urging force of the elastic suspension 19 and the lift.

When the carriage 16 is driven to swing about the support shaft 15 during the flight of the flying head slider 21, the flying head slider 21 is allowed to cross the recording tracks defined on the magnetic recording disk 13 in the radial direction of the magnetic recording disk 13. This radial movement serves to position the flying head slider 21 right above a target recording track on the magnetic recording disk 13. An actuator 22 such as a voice coil motor (VCM) may serve to realize the swinging movement of the carriage 16. As conventionally known, in the case where two or more magnetic recording disks 13 are incorporated within the inner space of the main enclosure 12, the swinging arm 17 may hold a pair of the head suspension assembly 18 between the adjacent magnetic recording disks 13.

Figure 2:
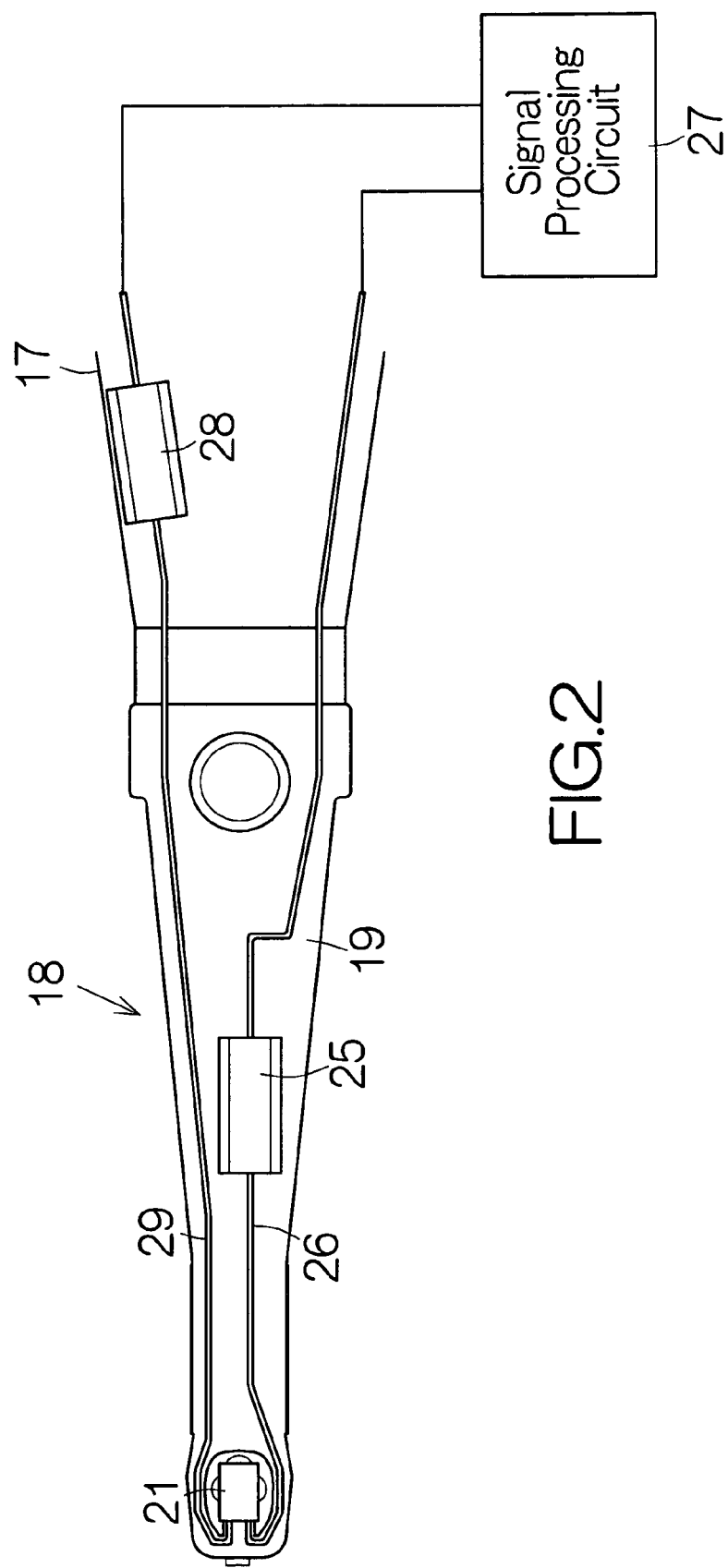
FIG. 2 is an enlarged plan view schematically illustrating the structure of a head suspension assembly.

As shown in FIG. 2, a dedicated read IC (Integrated Circuit) chip 25 is mounted on the elastic suspension 19 in the head suspension assembly 18. A read signal amplifier circuit is established in the dedicated read IC chip 25. The read signal amplifier circuit is designed to output amplified read signals. A wiring pattern or lead wire 26 is formed to extend on the surface of the elastic suspension 19. The lead wire 26 serves to establish connection between the read element on the flying head slider 21 and the dedicated read IC chip 25. A signal processing circuit 27 is connected to the dedicated read IC chip 25. The signal processing circuit 27 is located on a controller circuit board incorporated in the HDD 11, for example.

Likewise, a dedicated write IC chip 28 is mounted on the swinging arm 17. A write signal amplifier circuit is established in the dedicated write IC chip 28. The write signal amplifier circuit is designed to output amplified write signals or an amplified write current. A wiring pattern or lead wire 29 is formed to seamlessly extend on the surfaces of the elastic suspension 19 and the swinging arm 17 so as to establish connection between the write element on the flying head slider 21 and the dedicated write IC chip 28. The signal processing circuit 27 is connected to the dedicated write IC chip 28 in the same manner as described above.

Now, assume that the magnetic information data is written onto the magnetic recording disk 13. When the write element on the flying head slider 21 is opposed to the surface of the magnetic recording disk 13, the signal processing circuit 27 supplies the write element with the write current. The write current is amplified at the write signal amplifier circuit in the dedicated write IC chip 28. The amplified write current is supplied to the write element through the lead wire 29. The write element generates a magnetic field based on the supplied write current. The magnetic bit data is written onto the magnetic recording disk 13 in response to inversions in the polarization of the magnetic field.

In this case, the write current of approximately 4 mA is amplified to approximately 40 mA, for example, in the dedicated write IC chip 28. A larger electric current of this magnitude generates a large amount of heat energy in the dedicated write IC chip 28. However, the heat energy can be kept within the swinging arm 17. The heat energy hardly reaches the elastic suspension 19. Accordingly, the mechanical properties and shape can be maintained as expected in the elastic suspension 19.

Next, assume that the magnetic information data is read out of the magnetic recording disk 13. When the read element on the flying head slider 21 is opposed to the surface of the magnetic recording disk 13, the read element is allowed to receive a magnetic field acting from the magnetic recording disk 13. The inversion in the polarization of the magnetic field induces a variation in the electric resistance of the read element, for example. Supply of a sensing electric current to the read element induces a variation in the voltage appearing at the lead wire 26 in response to the variation in the electric resistance. The variation of the voltage appearing at the lead wire 26 is amplified in the read signal amplifier circuit within the dedicated read IC chip 25. The signal processing circuit 27 reads the magnetic bit data based on the amplified variation of the voltage.

When the magnetic bit data is read out, the dedicated read IC chip 25 receives the electric current of approximately 3 mA–5 mA, for example. The dedicated read IC chip 25 thus generates little heat energy. The elastic suspension 19 can be prevented from suffering from a larger amount of heat energy. Accordingly, the mechanical properties and the shape can be maintained as expected in the elastic suspension 19.

Figure 3:
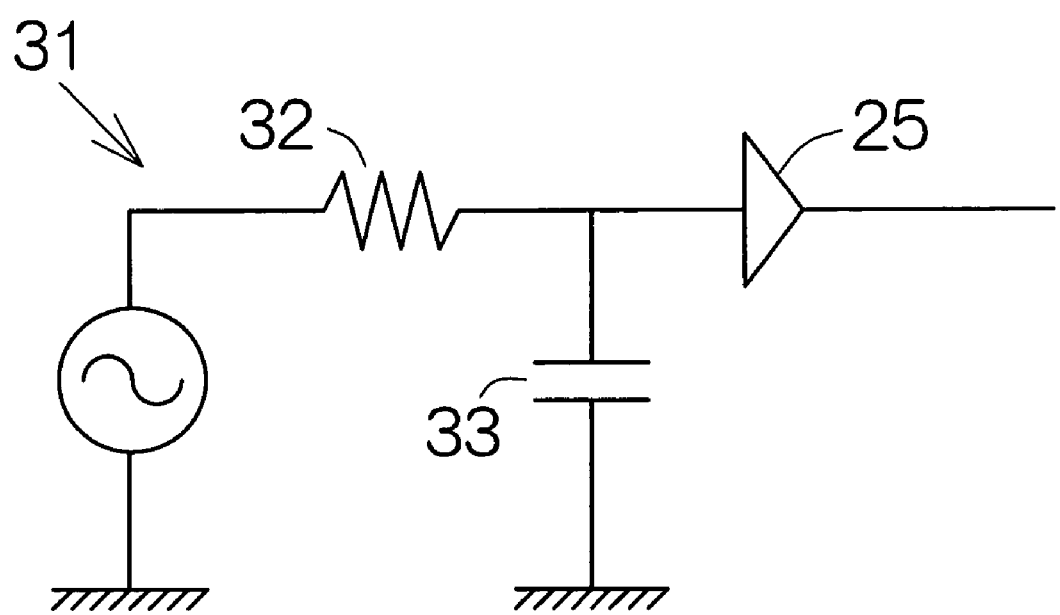
FIG. 3 is a schematic view of a low pass filter.

As shown in FIG. 3, when the magnetic bit data is read at the read element, a so-called low pass filter 31 is established based on the electric resistance value 32 of the read element and the stray capacitance 33 of the lead wire 26. An increase in the electric resistance value and/or the stray capacitance tends to lower the cutoff frequency of the low pass filter 31. The lowered cutoff frequency is an obstacle to establishment of a higher recording density of the magnetic information data. In particular, the read element such as a tunnel-junction magnetoresistive element having a high electric resistance value inevitably leads to a lowered cutoff frequency.

The length of the lead wire 26 can remarkably be shortened because the dedicated read IC chip 25 is located on the elastic suspension 19 in the aforementioned head suspension assembly 18. The stray capacitance 33 of the lead wire 26 can remarkably be reduced. Accordingly, the cutoff frequency of the low pass filter 31 can be maintained within a relatively high frequency band. The head suspension assembly 18 enables establishment of a higher density of the magnetic information data even if the assembly 18 employs the read element such a tunnel-junction magnetoresistive element having a high electric resistance value, for example.

It should be noted that the write element and the dedicated write IC chip 28 may be omitted from the head suspension assembly 18.

What is claimed is:

1. A disk drive comprising:
   a head suspension supporting a head slider at a tip end thereof;
   a dedicated read IC chip located on the head suspension and connected to a read element on the head slider;
   a swinging arm supporting the head suspension at a tip end thereof and coupled to a support shaft for relative rotation; and
   a dedicated write IC chip located on the swinging arm and connected to a write element on the head slider.

2. The disk drive according to claim 1, wherein a length of a wiring connecting the read element to the dedicated read IC chip is set shorter than a length of a wiring connecting the write element to the dedicated write IC chip.

3. The disk drive according to claim 1, wherein the dedicated read IC chip is located closer to the head slider than the dedicated write IC chip is.

4. The disk drive according to claim 1, wherein the read element is a tunnel-junction magnetoresistive element.

* * * * *